(12) United States Patent
Aoki

(10) Patent No.: US 9,288,384 B2
(45) Date of Patent: Mar. 15, 2016

(54) IMAGE DEVICE AND FOCUS CONTROL METHOD

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/529,979

(22) Filed: Oct. 31, 2014

(65) Prior Publication Data

US 2015/0055011 A1   Feb. 26, 2015

Related U.S. Application Data

(63) Continuation of application No. PCT/JP2013/060208, filed on Apr. 3, 2013.

(30) Foreign Application Priority Data

May 1, 2012   (JP) .................................. 2012-104574

(51) Int. Cl.
| | |
|---|---|
| *H04N 5/232* | (2006.01) |
| *G02B 7/34* | (2006.01) |
| *G03B 13/36* | (2006.01) |
| *H04N 5/369* | (2011.01) |
| *H04N 9/04* | (2006.01) |

(52) U.S. Cl.
CPC .............. *H04N 5/23212* (2013.01); *G02B 7/34* (2013.01); *G03B 13/36* (2013.01); *H04N 5/3696* (2013.01); *H04N 9/045* (2013.01)

(58) Field of Classification Search
CPC .................................................. H04N 5/23212
See application file for complete search history.

(56) References Cited

U.S. PATENT DOCUMENTS

| | | |
|---|---|---|
| 2004/0207747 A1 | 10/2004 | Ikeda |
| 2011/0298963 A1 | 12/2011 | Kato et al. |
| 2013/0100338 A1 | 4/2013 | Iwasaki |

FOREIGN PATENT DOCUMENTS

| | | |
|---|---|---|
| JP | 11-258489 A | 9/1999 |
| JP | 11-258492 A | 9/1999 |
| JP | 2008-199477 A | 8/2008 |
| WO | WO 2011/136031 A1 | 3/2011 |

OTHER PUBLICATIONS

Foreign Office Action of 11 2013 002 286.9 dated Apr. 30, 2015 with English translation.
International Search Report issued in PCT/JP2013/060208 dated Jul. 16, 2013.

*Primary Examiner* — Gary C Vieaux
(74) *Attorney, Agent, or Firm* — Birch, Stewart, Kolasch & Birch, LLP

(57) ABSTRACT

When reliability of a defocus amount which is calculated using a signal from a region 50A is low, a digital camera expands the phase difference detection target region to the regions 50A, 50B, and 50C. Further, the digital camera calculates a defocus amount using a correlation operation result of an output signal group of pixel cells 31R in an odd numbered column and an output signal group of the pixel cells 31L in an odd numbered column and a correlation operation result of an output signal group of pixel cells 31R in an even numbered column and an output signal group of the pixel cells 31L in an even numbered column, in the regions 50A, 50B, and 50C.

9 Claims, 9 Drawing Sheets

IMAGE DEVICE AND FOCUS CONTROL METHOD

CROSS REFERENCE TO RELATED APPLICATION

This is a continuation of International Application No. PCT/JP2013/060208 filed on Apr. 3, 2013, and claims priority from Japanese Patent Application No. 2012-104574, filed on May 1, 2012, the entire disclosures of which are incorporated herein by reference.

TECHNICAL FIELD

The present invention relates to an imaging device and a focus control method.

BACKGROUND ART

Recently, as the resolution of a solid-state imaging element such as a charge coupled device (CCD) image sensor and a complementary metal oxide semiconductor (CMOS) image sensor becomes higher, a demand for an information device including an imaging function such as a digital still camera, a digital video camera, a cellular phone, and a personal digital assistant (PDA) is rapidly increasing. In the meantime, the information device having an imaging function as described above is referred to as an imaging device.

However, a focus control method which focuses on a main subject includes a contrast auto focus (AF) method and a phase difference AF method. Since the phase difference AF method may detect a focusing position with high precision at a high speed as compared with the contrast AF method, the phase difference AF method is widely employed in various imaging devices (see, for example, Patent Literature L).

In the phase difference AF method, generally, a phase difference (a deviated amount of an image) is detected by performing a correlation operation using a signal output from a photoelectric converting element for phase difference detection in a fixed area of the solid-state imaging element. However, when a region where a signal for phase difference detection is obtained is fixed, if a contrast of a subject is low, a phase difference may not be precisely detected.

Therefore, Patent Literature 1 discloses a method that broadens a region where a signal for phase difference detection is obtained to improve precision of phase difference detection when a contrast of a subject is low.

Specifically, Patent Literature 1 also discloses a method which, when a first focus is detected, performs correlation operation by setting a pitch of a signal for phase difference detection which is used for the correlation operation to be half a pixel pitch of the photoelectric converting element and roughly adjusts a focus by detecting a phase difference with low precision and thereafter, performs the correlation operation by setting the pitch of the signal for phase difference detection which is used for the correlation operation to be equal to the pixel pitch of the photoelectric converting element to detect the phase difference with high precision.

CITATION LIST

Patent Literature

Patent Literature 1: JP-A-H11-258492

SUMMARY OF INVENTION

Technical Problem

As disclosed in Patent Literature 1, as a result of the correlation operation, when the phase difference is not detected due to low contrast of the subject, a phase difference detecting target region is broadened to perform the correlation operation again, so that signals for phase difference detection obtained from the broadened region are increased as compared with the first correlation operation. Therefore, when all signals for phase difference detection are used to perform the general correlation operation, it takes much time to detect a phase difference.

Therefore, when a method of interleaving signals for phase difference detection obtained from the broadened region to be read is adopted, a time for correlation operation may be shortened. However, when the signals for phase difference detection are interleaved, a precision of phase difference detection is lowered.

Patent Literature 1 does not disclose a configuration for increasing a speed of the phase difference AF in a method that performs the correlation operation two times and broadens the phase difference detecting target region in a second correlation operation.

The present invention has been made in an effort to provide an imaging device and a focus control method which may perform phase difference AF with high precision and at a high speed.

Solution to Problem

The present invention provides an imaging device, including: an imaging element that has a plurality of pairs of first pixel cells and second pixel cells receiving a pair of light fluxes passing through different pupil regions of an photographing optical system and outputting signals according to a light amount; a first defocus amount calculating unit that calculates a defocus amount using a narrow range signal group obtained from the plurality of pairs in a first range; a second defocus amount calculating unit that calculates a defocus amount using a broad range signal group obtained from all the pairs in a second range which includes the first range and is broader than the first range; and a focus control unit that controls a focus state of the imaging optical system based on the defocus amount calculated by the first defocus amount calculating unit and the defocus amount calculated by the second defocus amount calculating unit, in which the second defocus amount calculating unit generates a broad pitch signal group having an arrangement pitch being larger than an arrangement pitch of the narrow range signal groups using the broad range signal group and calculates the defocus amount using the broad pitch signal group.

The present invention provides a focus control method of an imaging device including an imaging element that has a plurality of pairs of first pixel cells and second pixel cells receiving a pair of light fluxes passing through different pupil regions of an photographing optical system and outputting signals according to a light amount, the method including: a first defocus amount calculating step that calculates a defocus amount using a narrow range signal group obtained from the plurality of pairs in a first range; a second defocus amount calculating step that calculates a defocus amount using a broad range signal group obtained from all the pairs in a second range which includes the first range and is broader than the first range: and a focus control step that controls a focus state of the imaging optical system based on the defocus amount calculated by the first defocus amount calculating step and the defocus amount calculated by the second defocus amount calculating step, in which the second defocus amount calculating step generates a broad pitch signal group having an arrangement pitch being larger than an arrangement pitch of the narrow range signal groups using the broad range signal group and calculates the defocus amount using the broad pitch signal group.

Advantageous Effects of Invention

According to the present invention, an imaging device and a focus control method which may perform phase difference AF with high precision and at a high speed may be provided.

DESCRIPTION OF EMBODIMENTS

Hereinafter, one embodiment of the present invention will be described with reference to drawings.

First Embodiment

Figure 1:
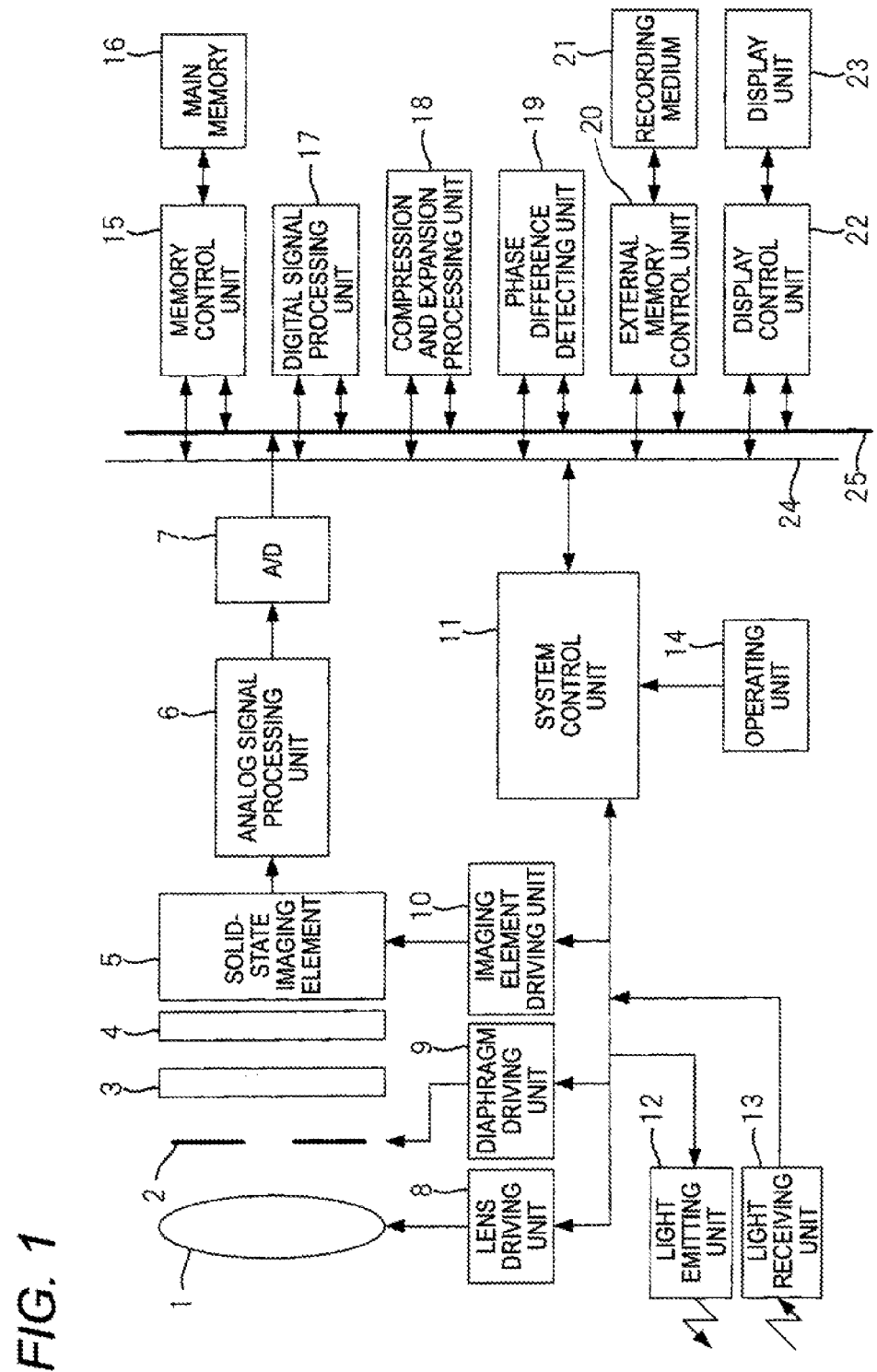
FIG. 1 is a diagram illustrating a schematic configuration of a digital camera which is an example of an imaging device for explaining a first embodiment of the present invention.

FIG. 1 is a diagram illustrating a schematic configuration of a digital camera as an example of an imaging device for explaining a first embodiment of the present invention.

An imaging system of a digital camera illustrated in FIG. 1 includes a photographing lens 1 as a photographing optical system, a solid-state imaging element 5 such as a CCD image sensor or a CMOS image sensor, a diaphragm 2 provided therebetween, an infrared cut filter (IRCUT) 3, and an optical low pass filter (OLPF) 4.

A system control unit 11 which collectively controls an entire electrical control system of the digital camera controls a flash light emitting unit 12 and a light receiving unit 13. Further, the system control unit 11 controls a lens driving unit 8 to adjust a position of a focus lens which is included in the photographing lens 1 or a position of a zoom lens which is included in the photographing lens 1. Moreover, the system control unit 11 controls an aperture size of the diaphragm 2 through a diaphragm driving unit 9 so as to adjust an exposure amount.

Further, the system control unit 11 drives the solid-state imaging element 5 through an imaging element driving unit 10 to output a subject image captured through the photographing lens 1 as a captured image signal. An instruction signal from a user is input to the system control unit 11 through an operating unit 14.

The electrical control system of the digital camera further includes an analog signal processing unit 6 connected to an output of the solid-state imaging element 5 to perform an analog signal processing such as correlated double sampling processing and an A/D converting circuit 7 which converts a RGB color signal output from the analog signal processing unit 6 into a digital signal. The analog signal processing unit 6 and the A/D converting circuit 7 are controlled by the system control unit 11. When the solid-state imaging element 5 is a CMOS image sensor, the analog signal processing unit 6 and the A/D converting circuit 7 may be mounted in the solid-state imaging element 5.

Moreover, the electrical control system of the digital camera includes a main memory 16, a memory control unit 15 which is connected to the main memory 16, a digital signal processing unit 17 which performs an interpolation operation, a gamma correction operation, and RGB/YC conversion processing to generate photographed image data, a compression and expansion processing unit 18 which compresses the photographed image data generated in the digital signal processing unit 17 in a JPEG format or expands the compressed image data, a phase difference detecting unit 19 which calculates a defocus amount using an imaging signal output from a pixel cell for phase difference detection included in the solid-state imaging element 5, an external memory control unit 20 to which a detachable recording medium 21 is connected, and a display control unit 22 to which a display unit 23 mounted on a rear surface of a camera is connected. The memory control unit 15, the digital signal processing unit 17, the compression and expansion processing unit 18, the phase difference detecting unit 19, the external memory control unit 20, and the display control unit 22 are connected to each other by a control bus 24 and a data bus 25 to be controlled by a command from the system control unit 11.

Figure 2:
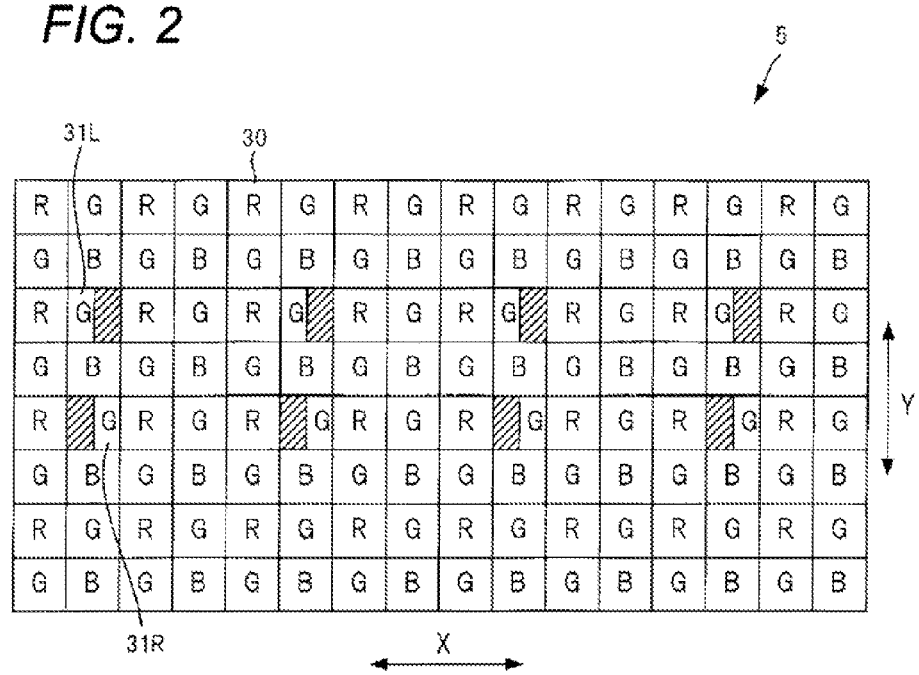
FIG. 2 is a schematic plan view illustrating a partial configuration of a solid-state imaging element 5 which is mounted in the digital camera illustrated in FIG. 1.

FIG. 2 is a schematic plan view illustrating a partial configuration of a solid-state imaging element 5 which is mounted in the digital camera illustrated in FIG. 1.

The solid-state imaging element 5 includes a plurality of pixel cells 51 (square shapes in the drawing) which is two-dimensionally (in a square lattice shape in an example of FIG. 2) arranged in a row direction X and a column direction Y orthogonal to the row direction. The plurality of pixel cells is formed such that pixel cell rows including a plurality of pixel cells which are arranged in parallel in the row direction X at a constant pitch are arranged in parallel in the column direction Y at a constant pitch. The plurality of pixel cells includes an imaging pixel cell 30, a phase difference detecting pixel cell 31L, and a phase difference detecting pixel cell 31R.

The imaging pixel cell 30 is a pixel cell which receives both a pair of light components (for example, a light component passing through a left side with respect to a major axis of the photographing lens 1 and a light component passing through a right side) which pass through different pupil regions of the photographing lens 1 illustrated in FIG. 1.

The phase difference detecting pixel cell 31L is a pixel cell which receives one of the pair of light components and has a configuration in which an opening (a region which is not hatched) of a photoelectric converting unit is deviated to the left side as compared with the imaging pixel cell 30.

The phase difference detecting pixel cell 31R is a pixel cell which receives the other one of the pair of light components and has a configuration in which an opening (a region which is not hatched) of the photoelectric converting unit is deviated to the right side as compared with the imaging pixel cell 30.

A color filter is mounted above the photoelectric converting unit which is included in the pixel cell and the arrangement of the color filters is a Beyer arrangement for all of the plurality of pixel cells which configures the solid-state imaging element 5.

In FIG. 2, "R" denotes a pixel cell in which a color filter which transmits a red (R) light component is mounted. Further, "G" denotes a pixel cell in which a color filter which transmits a green (G) light component is mounted. Further, "B" denotes a pixel cell in which a color filter which transmits a blue (B) light component is mounted.

The phase difference detecting pixel cells 31L are arranged in a position of the pixel cell on which the color filter which transmits the green G light component is mounted at three-pixel cell intervals, in a third pixel cell row from the top of FIG. 2.

The phase difference detecting pixel cells 31R are arranged in a position of the pixel cell on which the color filter which transmits the green G light component is mounted at three-pixel cell intervals, in a fifth pixel cell row from the top of FIG. 2.

The phase difference detecting pixel cell 31L and the phase difference detecting pixel cell 31R which are located in the same direction in the row direction X form a pair and the solid-state imaging element 5 has a configuration in which a plurality of pairs is formed.

Figure 3:
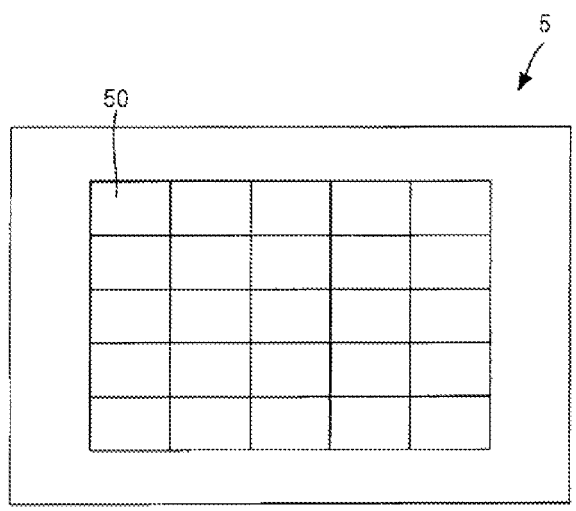
FIG. 3 is a schematic plan view illustrating a solid-state imaging element 5 in the digital camera illustrated in FIG. 1.

FIG. 3 is a schematic plan view illustrating a solid-state imaging element 5 in the digital camera illustrated in FIG. 1.

A plurality of regions 50 which are arranged in a lattice form at a center of the solid-state imaging element 5 corresponds to a region including the phase difference detecting pixel cell 31L and the phase difference detecting pixel cell 31R. In each of the plurality of regions 50, the imaging pixel cell 30, the phase difference detecting pixel cell 31L, and the phase difference detecting pixel cell 31R are arranged as illustrated in FIG. 2. In other regions than the region 50, only the imaging pixel cells 30 are arranged.

A user of the digital camera may select at least one of the plurality of regions 50 to adjust a focus in a region of the subject of which an image is formed on the selected region 50.

The phase difference detecting unit 19 illustrated in FIG. 1, calculates a focus adjustment state of the photographing lens 1 which is an amount deviated from the focus state and a direction thereof in this case, that is, a defocus amount using a signal group read out from the phase difference detecting pixel cell 31L, and the phase difference detecting pixel cell 31R. The phase difference detecting unit 19 functions as a first defocus amount calculating unit and a second defocus amount calculating unit which calculate the defocus amount.

The system control unit 11 illustrated in FIG. 1 controls a position of a focus lens which is included in the photographing lens 1 based on the defocus amount calculated by the phase difference detecting unit 19. The system control unit 11 functions as a focus control unit which controls a focus state of the imaging optical system.

Figure 4:
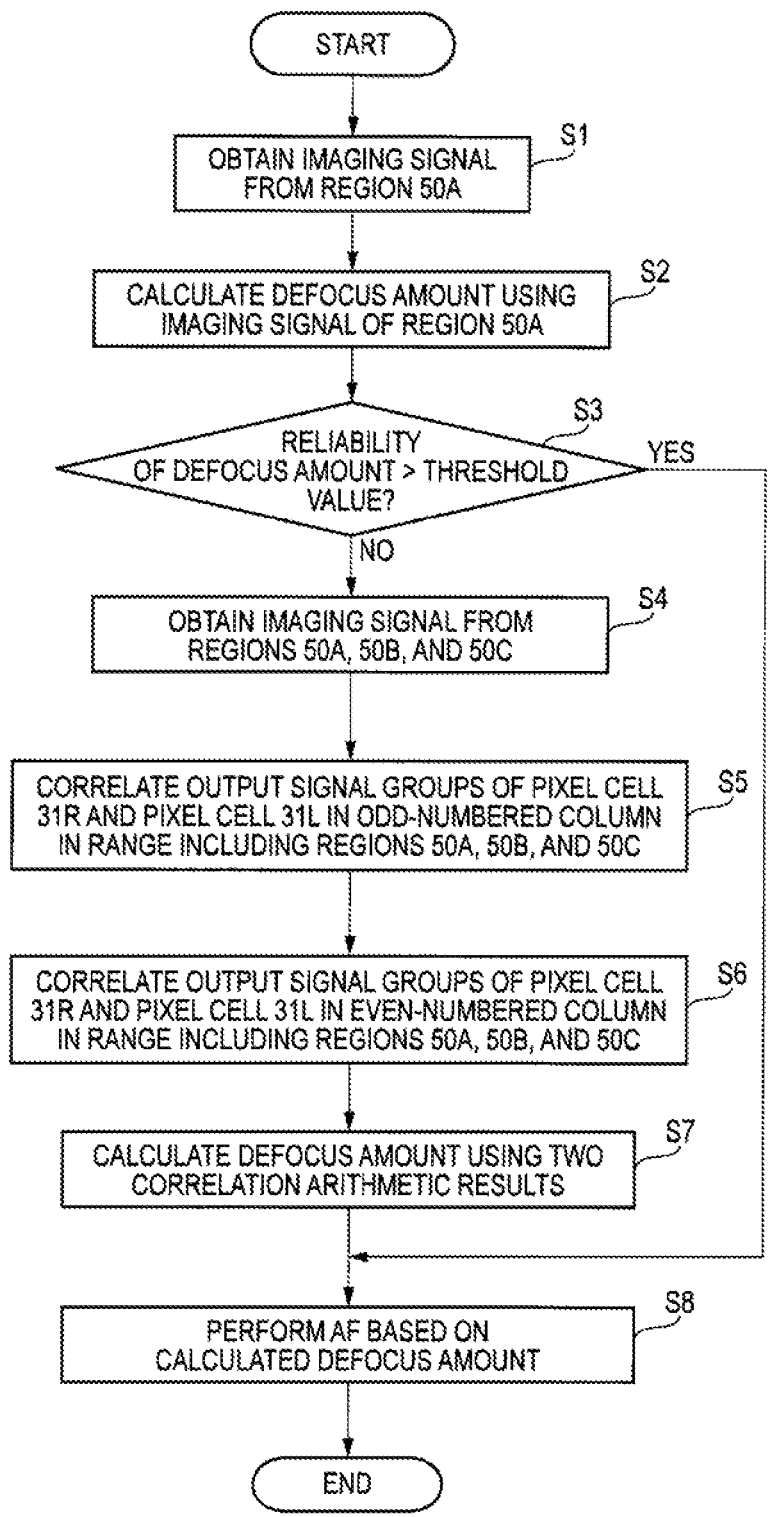
FIG. 4 is a flow chart explaining a focus control method by the digital camera illustrated in FIG. 1.

Next, a focus control method by the digital camera illustrated in FIG. 1 will be described. FIG. 4 is a flow chart explaining a focus control method by the digital camera illustrated in FIG. 1.

Figure 5:
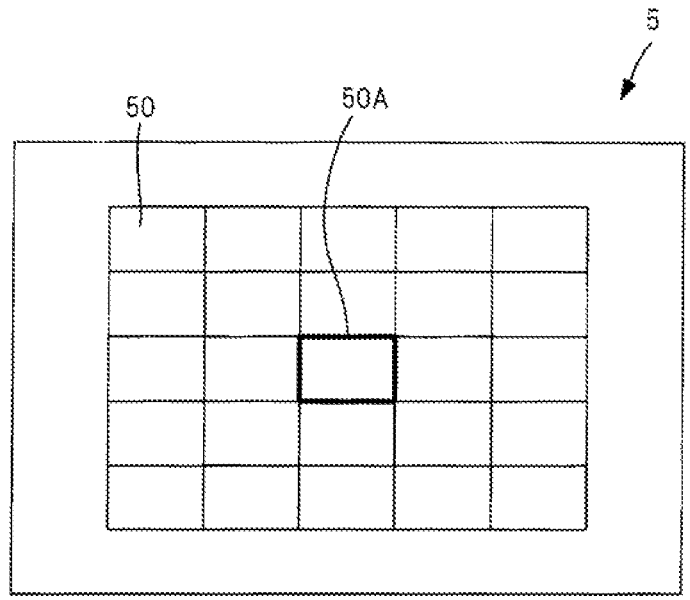
FIG. 5 is a view explaining a focus control method by the digital camera illustrated in FIG. 1.

In a state when one region 50A (see FIG. 5) among the plurality of regions 50 illustrated in FIG. 3 is set as a phase difference detecting target region by a user, when an AF instruction is issued, the system control unit 11 drives the solid-state imaging element 5 through the imaging element driving unit 10 to read out an imaging signal from the phase difference detecting pixel cells 31R and 31L included in the solid-state imaging element 5. Further, the phase difference detecting unit 19 obtains the imaging signal which is read out from the phase difference detecting pixel cells 31R and 31L in the region 50A, among the read-out imaging signals in step S1.

Next, the phase difference detecting unit 19 performs correlation operation on the first signal group read out from the phase difference detecting pixel 31L and the second signal group read out from the phase difference detecting pixel 31R, among the obtained imaging signals to detect a phase difference of the first signal group and the second signal group. Further, the phase difference detecting unit 19 calculates the defocus amount based on the detected phase difference in step S2.

After step S2, the phase difference detecting unit 19 determines reliability of the calculated defocus amount in step S3. The reliability is determined by an intensity of the contrast of the captured image signal.

When the reliability of the calculated defocus amount is high (Yes in step S3), the phase difference detecting unit 19 transmits the defocus amount calculated in step S2 to the system control unit 11. The system control unit 11 drives the photographing lens 1 in an optical axis direction as much as the received defocus amount to achieve the focus state in step S8.

Figure 6:
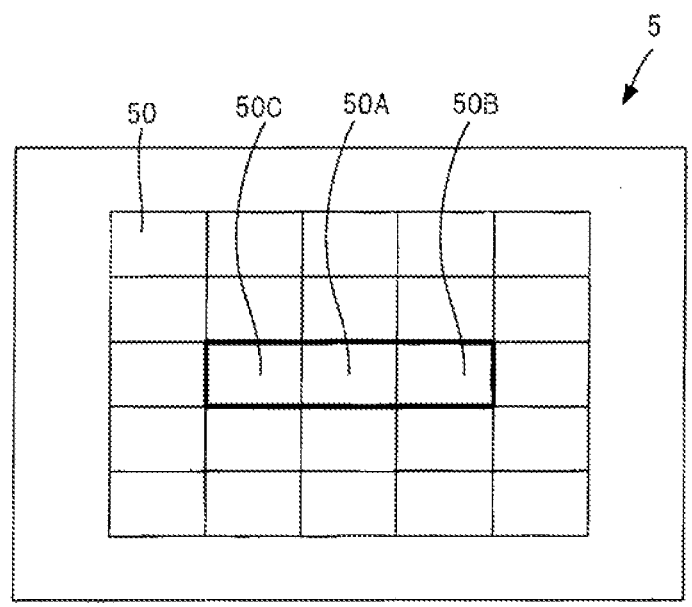
FIG. 6 is a view explaining a focus control method by the digital camera illustrated in FIG. 1.

When the reliability of the defocus amount is low (No in step S3), the phase difference detecting unit 19 broadens a range of the phase difference detecting target. Specifically, the phase difference detecting unit 19, as illustrated in FIG. 6, sets a range including a predetermined region 50A and two regions 50B and 50C which are adjacent thereto as a range of the phase difference detecting target. Here, a range which includes the region 50A and is also larger than the region 50A may be set as the range of the phase difference detecting target.

When the range of the phase difference detecting target is set, the system control unit S11 drives the solid-state imaging element 5 through the imaging element driving unit 10 to read out the imaging signals from the phase difference detecting pixel cells 31R and 31L, again. Further, the phase difference detecting unit 19 obtains the imaging signal which is read out from the phase difference detecting pixel cells 31R and 31L in a range including the regions 50A, 50B, and 50C, among the read-out imaging signals in step S4.

Figure 7:
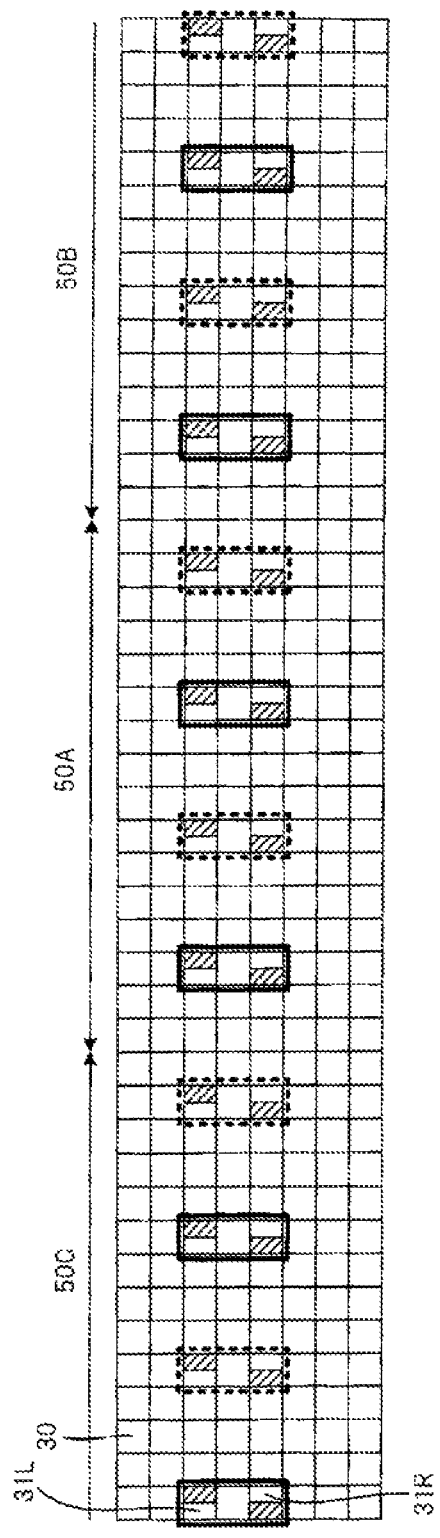
FIG. 7 is an enlarged view of a range including regions 50A, 50B, and 50C illustrated in FIG. 6.

FIG. 7 is an enlarged view of a range including regions 50A, 50B, and 50C illustrated in FIG. 6. Even though it is simplified for the convenience of description, actually, a plurality of phase difference detecting pixel cells as many as the correlation operation may be performed is arranged in each region. In step S4, the phase difference detecting unit 19 obtains imaging signals read out from twelve phase difference detecting pixel cells 31R and twelve phase difference detecting pixel cells 31L illustrated in FIG. 7.

Next, the phase difference detecting unit 19 performs a correlation operation on half of imaging signals read out from the twelve phase difference detecting pixel cells 31R illustrated in FIG. 7 and half of imaging signals read out from the twelve phase difference detecting pixel cells 31L illustrated in FIG. 7 in step S5.

Specifically, the phase difference detecting unit 19 performs the correlation operation on a signal group read out from six phase difference detecting pixel cells 31R (the phase difference detecting pixel cells 31R in a range enclosed by a bold line in FIG. 7) in an odd numbered column in the arrangement of the twelve phase difference detecting pixel cells 31R and a signal group read out from six phase difference detecting pixel cells 31L (the phase difference detecting pixel cells 31L in a range enclosed by a bold line in FIG. 7) in an odd numbered column in the arrangement of the twelve phase difference detecting pixel cells 31L.

Next, the phase difference detecting unit 19 performs a correlation operation on the other half of the imaging signals read out from the twelve phase difference detecting pixel cells 31R illustrated in FIG. 7 and the other half of the imaging signals read out from the twelve phase difference detecting pixel cells 31L illustrated in FIG. 7 in step S6.

Specifically, the phase difference detecting unit 19 performs the correlation operation with a signal group read out from six phase difference detecting pixel cells 31R (the phase difference detecting pixel cells 31R in a range enclosed by a broken line in FIG. 7) in an even numbered column in the arrangement of the twelve phase difference detecting pixel cells 31R and a signal group read out from six phase difference detecting pixel cells 31L (the phase difference detecting pixel cells 31L in a range enclosed by a broken line in FIG. 7) in an even numbered column in the arrangement of the twelve phase difference detecting pixel cells 31L.

Next, the phase difference detecting unit 19 calculates the defocus amount and transmits the calculated defocus amount to the system control unit 11, using the correlation operation result in step S5 and the correlation operation result in step S6, in step S7.

For example, the phase difference detecting unit 19 calculates the defocus amount from the phase difference obtained by the correlation operation in step S5 and the defocus amount from the phase difference obtained by the correlation operation in step S6, and calculates an average of the two defocus amounts as a final defocus amount and transmits the defocus amount to the system control unit 11.

Alternatively, the phase difference detecting unit 19 defines the correlation operation equation $S(\alpha)$ by the following equation (1) or (2) when two signal groups which become the phase difference detecting target are represented by functions $f(x+\alpha)$ and $g(x)$.

$$S(\alpha)=\int |f(x+\alpha)-g(x)|dx \qquad (1)$$

$$S(\alpha)=\int (f(x+\alpha)-g(x))^2 dx \qquad (2)$$

Here, $\alpha$ indicates a deviated amount of two signal groups.

The phase difference detecting unit 19 generates correlation operation curves having $\alpha$ as a transverse axis and $S(\alpha)$ as a vertical axis by the correlation operation of Equation (1) or Equation (2) in steps S5 and S6, respectively. The phase difference detecting unit 19 adds the two generated correlation operation curves and calculates $\alpha$ at which a value of $S(\alpha)$ is minimum in the added correlation curve as the defocus amount and transmits the defocus amount to the system control unit 11.

After step S7, the system control unit 11 drives the photographing lens 1 in an optical axis direction as much as the received defocus amount to achieve the focus state in step S8.

As described above, according to the digital camera illustrated in FIG. 1, even when the defocus amount having high reliability cannot be calculated only in the region 50A, the defocus amount is recalculated by broadening the range of the phase difference detecting target so that a defocus amount having high reliability may be calculated. Therefore, even when a contrast of the subject is low, the phase difference AF may be performed with high precision.

Further, according to the digital camera, even when the range of the phase difference detecting target is broadened, the phase difference is detected using all signals from the phase difference detecting pixel cells 31R and 31L within the range, so that the precision for detecting the phase difference may be improved.

Further, in the digital camera, when the range of the phase difference detecting target is broadened, a correlation operation result of the signal group obtained from half of the phase difference detecting pixel cells 31R and 31L in the range and a correlation operation result of the signal group obtained from the other half of them are used to calculate the defocus amount. As described above, the correlation operation is performed to be divided two times, so that the number of signals for the signal group which is used for one time of correlation operation may be reduced, which may shorten time to perform the correlation operation. Further, the correlation operation may be simultaneously performed two times so that it is possible to shorten the time to calculate the defocus amount.

As described above, according to the digital camera illustrated in FIG. 1, both improvement of the phase difference AF precision and increase in speed of the phase difference AF may be achieved.

In the meantime, the digital camera illustrated in FIG. 1 detects the contrast of the subject by analyzing the captured image signal (an captured image signal from a region 50 designated by a user) output from the solid-state imaging element 5 at a time when the AF instruction is issued, by the system control unit 11 and when the contrast is larger than a predetermined value, determines that it is possible to detect the phase difference only in the designated region 50 with high precision and may perform step S1 and step S2 of FIG. 4 and then perform the processing of step S8 without performing step S3. In the meantime, when the contrast of the subject is equal to or smaller than the predetermined value, the digital camera performs processing after step S1 of FIG. 4.

As described above, only when the contrast of the subject is low, the processing after step S3 are performed, so that the speed of the phase difference AF may be improved.

Further, in FIG. 4, only when the reliability of the defocus amount calculated in step S2 is low, the processing after step S4 are performed but processing of step S4 may be performed after step S2 while omitting the processing of step S3. By doing this, the reliability of the defocus amount calculated in step S2 and the defocus amount calculated in step S7 is determined in step S8 to perform the AF control using any one having higher reliability.

Further, when the reliability is almost the same, two defocus amounts are used to calculate a final defocus amount (for example, calculate an average of the two defocus amounts) to improve the precision of the phase difference AF.

Further, the digital camera illustrated in FIG. 1 analyzes the captured image signal read-out from the solid-state imaging element 5 in No of step S3 of FIG. 4 by the system control unit 11 to detect a brightness of the subject and when the brightness is larger than a predetermined value, performs only any one of step S5 and step S6 to calculate the defocus amount from the correlation operation result of step S5 or step S6, in step S7.

When the subject is bright, the precision of the phase difference AF is improved, so that by doing as described above, the speed of the phase difference AF may be further improved. Furthermore, power consumption may be reduced.

When step S3 of FIG. 4 is No, the imaging element driving unit 10 may be driven to independently (in different fields) read out a signal used for an operation of step S5 and a signal used for an operation of step S6. By doing this, for example, when the processing of step S6 is not necessary, in No in step S3, the imaging element driving unit 10 may be driven to read out only a signal which is used for an operation of step S5 from the solid-state imaging element 5. As a result, high speed processing and low power consumption may be achieved.

Figure 8:
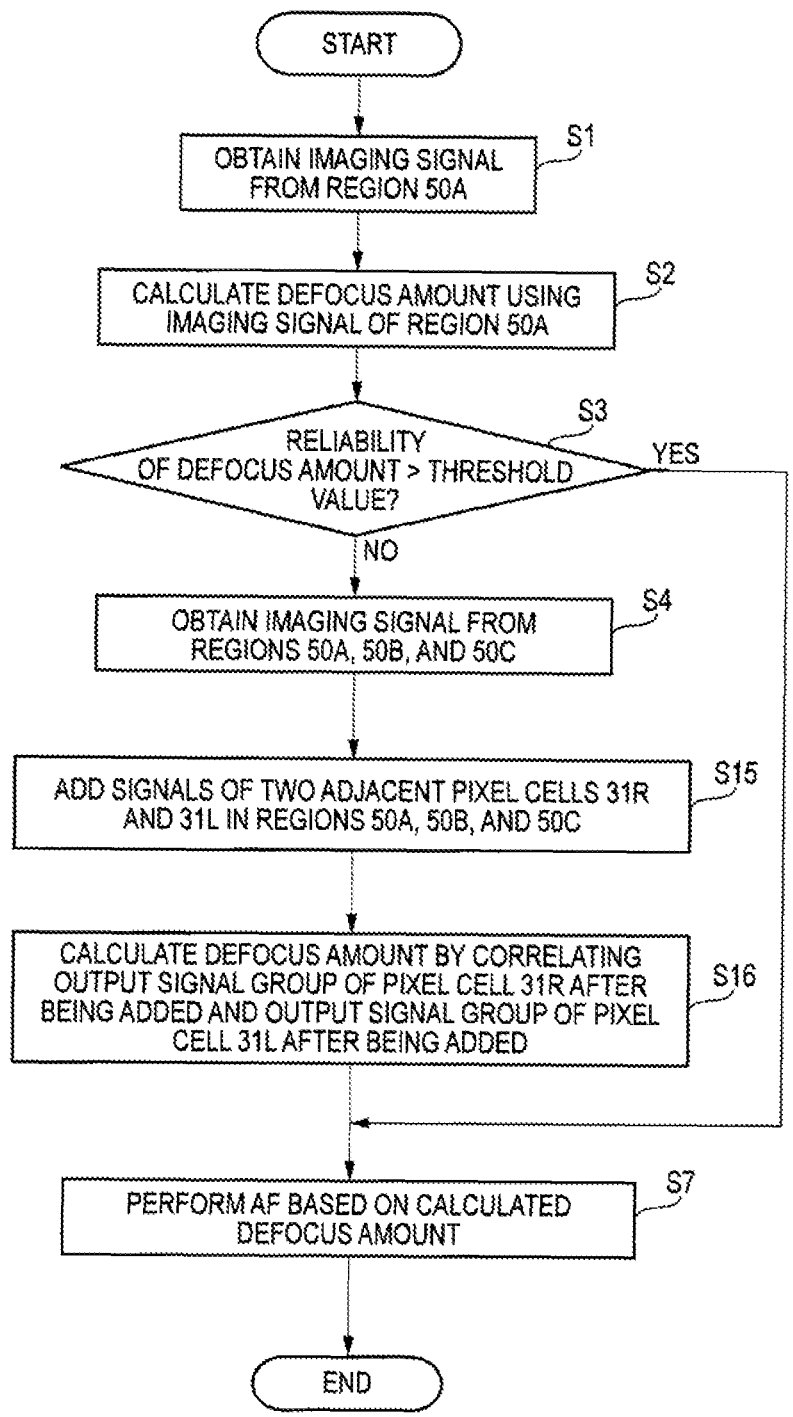
FIG. 8 is a flow chart explaining a modified embodiment of an operation of the digital camera illustrated in FIG. 1.

FIG. 8 is a flow chart explaining a modified embodiment of an operation of the digital camera illustrated in FIG. 1. In FIG. 8, the same processing as the processing illustrated in FIG. 4 is denoted by the same reference numerals and descriptions thereof will be omitted.

After step S4, the phase difference detecting unit 19 adds signals read out from two adjacent phase difference detecting pixel cells 31R among the twelve phase difference detecting pixel cells 31R illustrated in FIG. 7 and adds signals read out from two adjacent phase difference detecting pixel cells 31L among the twelve phase difference detecting pixel cells 31L illustrated in FIG. 7 in step S15.

Figure 9:
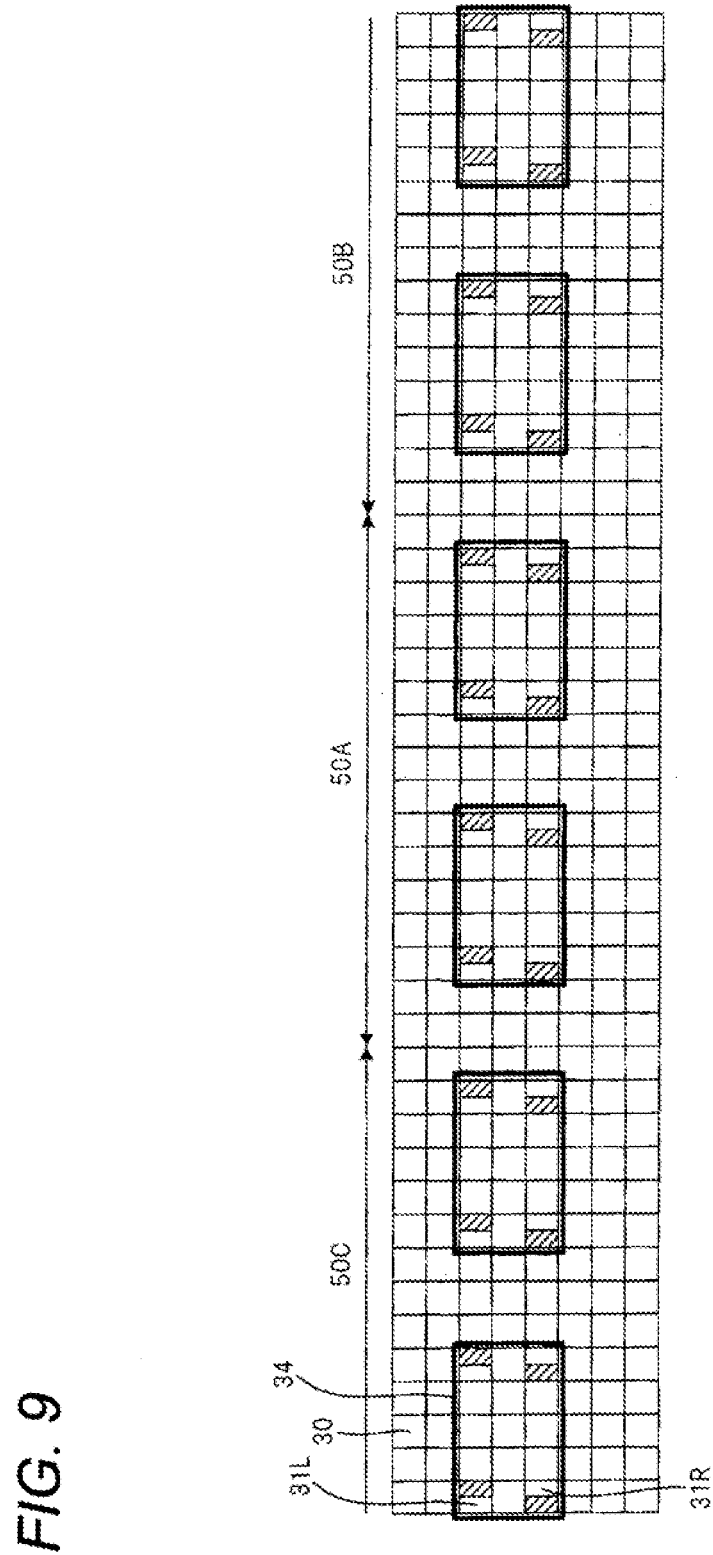
FIG. 9 is a view explaining a modified embodiment of an operation of the digital camera illustrated in FIG. 1.

As illustrated in FIG. 9, the phase difference detecting unit 19 divides each of the twelve phase difference detecting pixel cells 31R and the twelve phase difference detecting pixel cells 31R into four groups 34 which are adjacent to each other, respectively and adds the imaging signals of the phase difference detecting pixel cells 31R read out from the groups 34 to each other and adds the imaging signals of the phase difference detecting pixel cells 31L to each other to obtain six imaging signals corresponding to the phase difference detecting pixel cells 31R and six imaging signals corresponding to the phase difference detecting pixel cells 31L.

Next, the phase difference detecting unit 19 performs correlation operation on the six imaging signals corresponding to the phase difference detecting pixel cells 31R and the six imaging signals corresponding to the phase difference detecting pixel cells 31L to calculate a defocus amount and transmits the calculated defocus amount to the system control unit 11 in step S16. After step S16, processing of step S7 is performed.

As described above, according to the modified embodiment, even when the range of the phase difference detecting target is broadened, the phase difference is detected using all signals from the phase difference detecting pixel cells 31R and 31L within the range, so that the precision for detecting the phase difference may be improved.

Moreover, in this modified embodiment, when the range of the phase difference detecting target is broadened, a signal group obtained by adding the signal group obtained from the half of the phase difference detecting pixel cells 31R in the range and the signal group obtained from the other half of the phase difference detecting pixel cells 31R and a signal group obtained by adding the signal group obtained from the half of the phase difference detecting pixel cells 31L in the range and the signal group obtained from the other half of the phase difference detecting pixel cells 31L are correlated to calculate the defocus amount. Therefore, the correlation operation amount may be reduced.

Further, according to this modified embodiment, since a sensitivity of added two imaged signals is high, individual signals which configure the signal group which is used for the correlation operation are specifically effective for a dark subject.

As described above, according to the modified embodiment, both the improvement of the precision of the phase difference AF and the increase in the speed of the phase difference AF may also be achieved.

In the meantime, the digital camera analyzes the captured image signal read-out from the solid-state imaging element 5 by the system control unit 11 in No of step S3 of FIG. 8 to detect a brightness of the subject and when the brightness is larger than a predetermined value, performs the processing after step S4 of FIG. 4 and when the brightness is equal to or smaller than the predetermined value, performs the processing after step S4 of FIG. 8. The predetermined value may be previously recorded in a memory in the camera or arbitrarily set or changed by the user.

Further, the imaging signal may not be added outside the solid-state imaging element 5 in step S15 of FIG. 8, but added in the solid-state imaging element 5. As described above, the signals are added in the solid-state imaging element 5, so that an imaging signal with low noise may be obtained and therefore the precision of the phase difference AF may be further improved.

In the focus control method illustrated in FIG. 4, the signals output from the phase difference detecting pixel cells 31R and 31L in the regions 50A, 50B, and S(C may be arranged in a row direction X with an interval corresponding to three pixel cells in a space. Further, in each of the two signal groups which become targets of correlation operation in step S5 or step S6, signals are arranged on a space in the row direction X with an interval corresponding to seven pixel cells. In the meantime, the signals output from the pixel cells are associated with coordinate information indicating the positions of the signals in the space. In the present specification, the arrangement of the signals determined by the coordinate information is referred to as an arrangement of signals.

Further, in the focus control method illustrated in FIG. 8, in each of two signal groups which become targets of correlation operation in step S16, signals are arranged on the space in the row direction X with an interval corresponding to seven pixel cells. As described for the method of FIG. 8, when two signals which are adjacent in the row direction X are added, the coordinate information which is associated with the added signal indicates an intermediate position of positions of the two signals before being added.

As described above, in step S5 or S6 of FIG. 4 and step S16 of FIG. 8, an arrangement pitch of the signals of each of the two signal groups which become the targets of the correlation operation is larger than the arrangement pitch of the signal groups output from all the phase difference detecting pixel cells 31R and 31L in the regions 50A, 50 and 50C.

That is, in spite of using all signals output from all the phase difference detecting pixel cells 31R and 31L in the regions 50A, 50B, and 50C, the signal groups having a wide arrangement pitch are correlated to each other, so that the time for correlation operation is shortened, which may shorten the time to calculate the defocus amount.

In the meantime, in steps S5 and S6 of FIG. 4, even though the correlation operation is performed on the output signal group of the pixel cells 31R in an odd-numbered column and the output signal group of the pixel cells 31L in an odd numbered column in the range including the regions 50A, 50B, and 50C and the correlation operation is performed on the output signal group of the pixel cells 31R in an even-numbered column and the output signal group of the pixel cells 31L in an even-numbered column in the range, the present invention is not limited thereto.

For example, twelve pairs in the range are divided into a group of six pairs which are parallel to each other at every two cells in the row direction X and a group of remaining six pairs and the correlation operation is performed on the output signal group of the pixel cells 31R and the output group of the pixel cells 311, for every group and two correlation operation results may be used to calculate the defocus amount.

That is, two signal groups of a signal group obtained by sampling the signal groups output from all phase difference detecting pixel cells 31R and 31L in the regions 50A, 50B, and 50C with an interval of n signal groups and the remaining signal group may be signal groups which are a target of the correlation operation.

Further, twelve pairs in the range may be divided into three or more groups and the correlation operation is performed for each group to calculate the defocus amount using the result. In this case, the arrangement pitch of the signals obtained from the pair may be the same in each group.

Next, descriptions will be made on a configuration of a smart phone as an imaging device.

Figure 10:
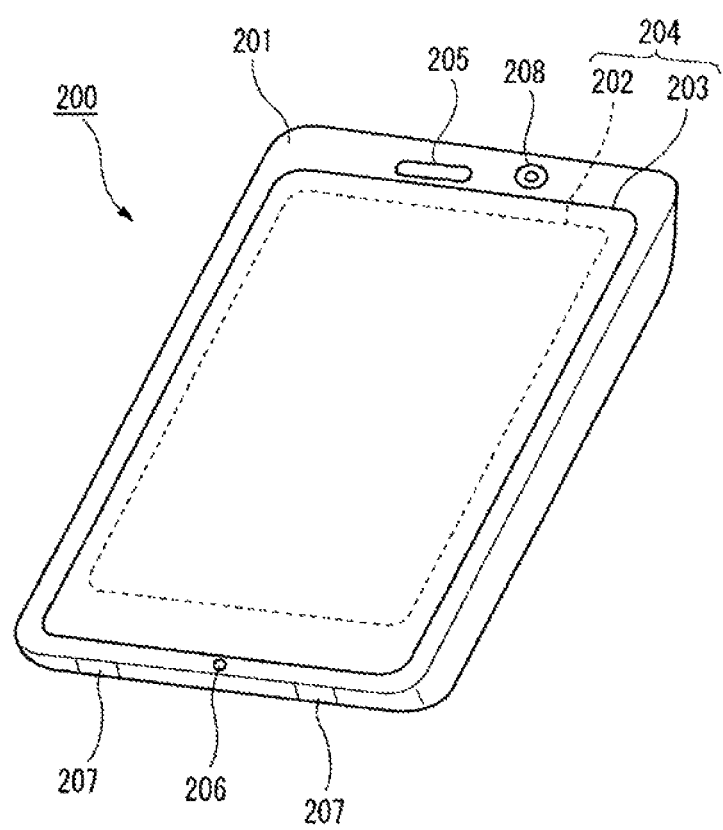
FIG. 10 is a view illustrating a configuration of a smart phone as an imaging device.

FIG. 10 illustrates an outer appearance of a smart phone 200 which is an embodiment of a photographing device of the present invention. The smart phone 200 illustrated in FIG. 10 includes a flat panel type housing 201 and is provided, on one surface of the housing 201, with a display input unit 204 in which a display panel 202 as a display unit, and an operating panel 203 as an input unit are integrated. In addition, the housing 201 includes a speaker 205, a microphone 206, an operating unit 207, and a camera 208. However, the configuration of the housing 201 is not limited thereto. For example, a configuration in which the display unit and the input unit are independent from each other may be employed or a configuration having a folding structure or a slide mechanism may be employed.

Figure 11:
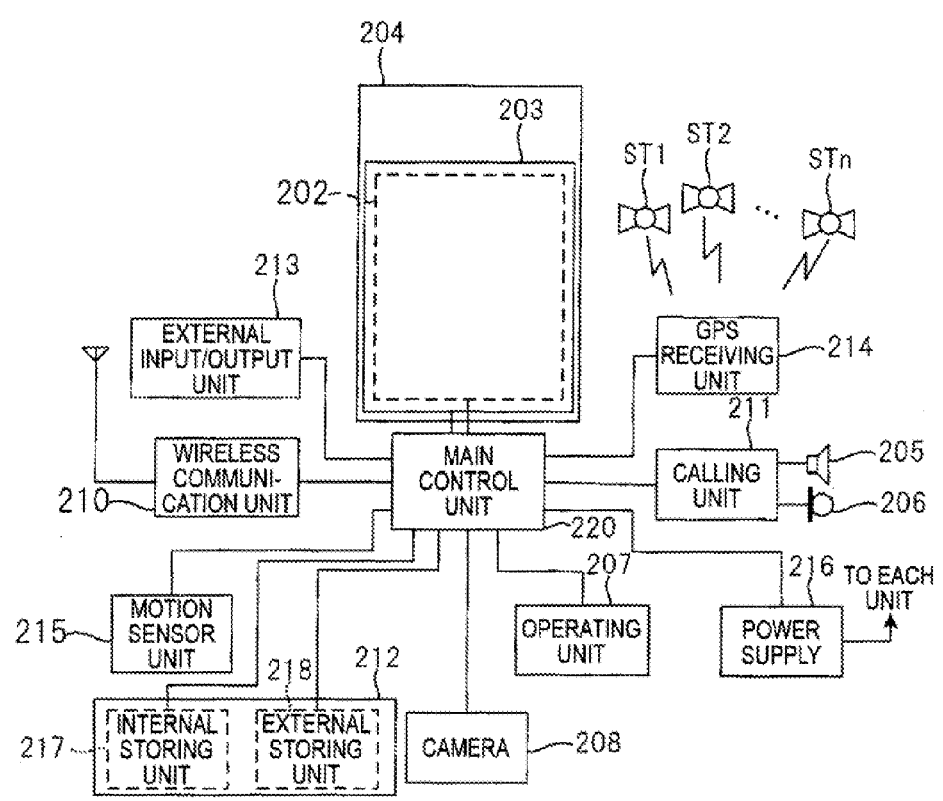
FIG. 11 is a block diagram illustrating an internal configuration of the smart phone illustrated in FIG. 10.

FIG. 11 is a block diagram illustrating a configuration of the smart phone 200 illustrated in FIG. 10. As illustrated in FIG. 10, as main components, the smart phone includes a wireless communication unit 210, a display input unit 204, a calling unit 211, an operating unit 207, a camera 208, a storing unit 212, an external input/output unit 213, a global positioning system (GPS) receiving unit 214, a motion sensor unit 215, a power supply 216, and a main control unit 220. Further, as a main function of the smart phone 200, the smart phone 200 is provided with a wireless communication function which performs mobile wireless communication through a base station device BS which is not illustrated and a mobile communication network NW which is not illustrated.

The wireless communication unit 210 performs wireless communication with the base station device BS which is accommodated in the mobile communication network NW in accordance with an instruction of the main control unit 220. Using the wireless communication, the wireless communication unit 210 transmits/receives various file data such as voice data and image data and electronic mail data or receives web data, streaming data, or the like.

The display input unit 204 is provided with a display panel 202 and an operating panel 203 as a so-called touch panel which displays an image (a still image or a moving picture) or text information under the control of the main control unit 220 so as to visually transmit information to a user, and detects the user's operation on displayed information.

The display panel 202 uses a liquid crystal display (LCD), an organic electroluminescence display (OELD), or the like, as a display device.

The operating panel 203 is a device which is disposed to allow an image displayed on a display surface of the display panel 202 to be visually recognized and detects one or a plurality of coordinates which can be operated by a finger of the user or a stylus. When the device is operated by the finger of the user or the stylus, a detection signal which is generated based on the operation is output to the main control unit 220.

Subsequently, the main control unit 220 detects an operating position (coordinate) on the display panel 202, based on the received detection signal.

As illustrated in FIG. 10, the display panel 202 and the operating panel 203 of the smart phone 200 exemplified as an embodiment of the photographing device of the present invention are integrated with each other to constitute the display input unit 204, in which the operating panel 203 may be disposed to completely cover the display panel 202.

When such an arrangement is employed, the operating panel 203 may be provided with a function of detecting the user's operation on a region other than the display panel 202. In other words, the operating panel 203 may include a detection region (hereinafter, referred to as a "display region") on an overlapping portion which overlaps the display panel 202 and a detection region (hereinafter, referred to as a "non-display region") for other outer peripheral portion which does not overlap the display panel 202.

Although the size of the display region and the size of the display panel 202 may completely coincide with each other, both sizes do not necessarily coincide with each other. In addition, the operating panel 203 may include two sensitive regions of an outer peripheral portion and an inner portion other than the outer peripheral portion. Moreover, a width of the outer peripheral portion is appropriately designed in accordance with the size of the housing 201. Moreover, a position detecting system employed in the operating panel 203, a matrix switch system, a resistive layer system, a surface elastic wave system, an infrared system, an electromagnetic induction system, or an electrostatic capacitive system may be exemplified, and any system may be employed.

The calling unit 211 includes the speaker 205 or the microphone 206 and converts the user's voice input through the microphone 206 into voice data to be processed by the main control unit 220 and outputs the converted voice data to the main control unit 220, or decodes voice data received by the wireless communication unit 210 or the external input/output unit 213 and outputs the decoded voice data from the speaker 205. Furthermore, as illustrated in FIG. 10, for example, the speaker 205 may be mounted on the same surface as the surface provided with the display input unit 204 and the microphone 206 may be mounted on a side surface of the housing 201.

The operating unit 207 is a hardware key which uses a key switch and receives an instruction from the user. For example, as illustrated in FIG. 10, the operating unit 207 is a push button type switch which is mounted on a side surface of the housing 201 of the smart phone 200 and turned on when the operating unit 207 is pressed by a finger and turned off by restoring force of a spring when the finger is removed.

The storing unit 212 stores a control program or control data of the main control unit 220, application software, address data to which names, phone numbers, or the like of communication counterparts are correlated, transmitted/received electronic mail data, web data downloaded by web browsing or downloaded content data, and temporarily stores streaming data. Further, the storing unit 212 is configured by an internal storing unit 217 which is mounted in the smart phone and an external storing unit 218 which includes a detachable external memory slot. Furthermore, the internal storing unit 217 and the external storing unit 218 which configure the storing unit 212 are implemented by using a storing medium such as a flash memory type, hard disk type, multimedia card micro type, card type memory (for example, MicroSD (registered trademark) memory), a random access memory (RAM), or a read only memory (ROM).

The external input/output unit 213 functions as an interface with all external devices which are connected to the smart phone 200 and is configured to be directly or indirectly connected to any other external device by communication (for example, universal serial bus (USB) or IEEE 1394) or a network (for example, Internet, wireless LAN, Bluetooth (registered trademark), a radio frequency identification (RFID), an infrared data association (IrDA (registered trademark)), ultra wideband (UWB: registered trademark), or a ZigBee (registered trademark).

As external devices connected to the smart phone 200, a wired/wireless head set, a wired/wireless external charger, a wired/wireless data port, a memory card or a SIM (subscriber identity module) card/UIM (user identity module) card connected through a card socket, an external audio/video device connected through an audio/video input/output (L/O) terminal, a wirelessly connected external audio/video device, a wiredly/wirelessly connected smart phone, a wiredly/wirelessly connected personal computer, a wiredly/wirelessly connected PDA, a wiredly/wirelessly connected personal computer, or an earphone may be exemplified. The external input/output unit 213 may transmit data which is received from such external devices to individual components in the smart phone 200 and may also allow the data in the smart phone 200 to be transmitted to an external device.

The GPS receiving unit 214 receives GPS signals which are transmitted from GPS satellites ST1 to STn according to an instruction from the main control unit 220 and performs position measurement operation processing based on the received GPS signals to detect positions including a latitude, a longitude, and a height of the smart phone 200. When the GPS receiving unit 214 may obtain positional information from the wireless communication unit 210 or the external input/output unit 213 (for example, the wireless LAN), the GPS receiving unit 214 may detect a position using that positional information.

The motion sensor unit 215 includes, for example, a three axis acceleration sensor and detects physical movement of the smart phone 200 according to the instruction of the main control unit 220. When the physical movement of the smart phone 200 is detected, the movement direction or acceleration of the smart phone 200 is detected. The detected result is output to the main control unit 220.

The power supply 216 supplies power which is accumulated in a battery (not illustrated) to individual units of the smart phone 200 according to the instruction of the main control unit 220.

The main control unit 220 includes a microprocessor and operates according to a control program or control data stored in the storing unit 212 and collectively controls individual units of the smart phone 200. Further, the main control unit 220 is provided with a mobile communication control function and an application processing function to control individual units of a communication system in order to perform voice communication or data communication through the wireless communication unit 210.

The application processing function is implemented when the main control unit 220 is operated according to the application software which is stored in the storing unit 212. The application processing function includes, for example, an infrared communication function which performs data communication with a counterpart device by controlling the external input/output unit 213, an electronic mail function which transmits/receives an electronic mail, and a web browsing function which browses a web page.

Further, the main control unit 220 is provided with an image processing function which displays an image on the display input unit 204 based on the image data (still image or moving picture data) such as received data or downloaded streaming data. The image processing function refers to a function of decoding the image data and performing image processing on the decoded result to display the image on the display input unit 204 by the main control unit 220.

Moreover, the main control unit 220 executes a display control of the display panel 202 and an operation detection control which detects a user's operation through the operating unit 207 and the operating panel 203. By executing the display control, the main control unit 220 displays an icon to activate application software or a software key such as a scroll bar or displays a window for preparing an electronic mail. Here, the scroll bar refers to a software key for receiving an instruction to move a displayed portion of an image with respect to a large image which is not covered by the display region of the display panel 202.

In addition, when the operation detection control is executed, the main control unit 220 detects the user's operation through the operating unit 207 or receives an operation on the icon or the input of a character string of an input section of the window through the operating panel 203 or receives a scroll request of a displayed image through the scroll bar.

Furthermore, by executing the operation detection control, the main control unit 220 is provided with a touch panel control function that determines whether the operating position of the operating panel 203 is an overlapping portion (display region) which overlaps the display panel 202 or an outer peripheral portion (non-display region) which does not overlap the display panel 202 other than the overlapping portion, and controls a sensitive region of the operating panel 203 or a display position of the software key.

Further, the main control unit 220 may detects a gesture operation with respect to the operating panel 203 and execute a predetermined function according to the detected gesture operation. The gesture operation refers to an operation which draws a trace using a finger, designates a plurality of positions simultaneously, or a combination thereof to draw a trace for at least one from the plurality of positions, rather than a simple touch operation of the related art.

The camera 208 includes a configuration other than the external memory control unit 20, the recording medium 21, the display control unit 22, the display unit 23, and the operating unit 14 in the digital camera which is illustrated in FIG. 1. Captured image data which is generated by the camera 208 may be stored in the storing unit 212 or output through the external input/output unit 213 or the wireless communication unit 210. As illustrated in FIG. 10, although the camera 208 is mounted on the same surface as the display input unit 204 in the smart phone 200, the mounting position of the camera 208 is not limited thereto and the camera 208 may be mounted on a rear surface of the display input unit 204.

Further, the camera 208 may be used for various functions of the smart phone 200. For example, an image which is obtained by the camera 208 may be displayed on the display panel 202, or the image of the camera 208 may be used as one of operation inputs of the operating panel 203. Further, when the GPS receiving unit 214 detects the position, the position may be detected with reference to the image from the camera 208. Moreover, an optical axis direction of the camera 208 of the smart phone 200 may be determined or a current usage environment may also be determined with reference to the image from the camera 208 either without using the 3-axis acceleration sensor or using the 3-axis acceleration sensor. Of course, the image from the camera 208 can be used in the application software.

In addition, positional information obtained by the GPS receiving unit 214, voice information obtained by the microphone 206 (which may be text information obtained by performing a voice-text conversion by the main control unit or the like), or posture information obtained by the motion sensor unit 215 may be added to the image data of a still image or a moving picture to be stored in the storing unit 212 or output through the external input/output unit 213 or the wireless communication unit 210.

Also in the smart phone 200 having the above-described configuration, phase difference AF may be performed with high precision and at a high speed.

As described above, the following matters are disclosed herein.

It is disclosed an imaging device, comprising: an imaging element that has a plurality of pairs of first pixel cells and second pixel cells receiving a pair of light fluxes passing through different pupil regions of an photographing optical system and outputting signals according to a light amount; a first defocus amount calculating unit that calculates a defocus amount using a narrow range signal group obtained from the plurality of pairs in a first range; a second defocus amount calculating unit that calculates a defocus amount using a broad range signal group obtained from all the pairs in a second range which includes the first range and is broader than the first range; and a focus control unit that controls a focus state of the imaging optical system based on the defocus amount calculated by the first defocus amount calculating unit and the defocus amount calculated by the second defocus amount calculating unit, wherein the second defocus amount calculating unit generates a broad pitch signal group having an arrangement pitch being larger than an arrangement pitch of the narrow range signal groups using the broad range signal group and calculates the defocus amount using the broad pitch signal group.

It is disclosed the imaging device, wherein the second defocus amount calculating unit performs first processing which generates as the broad pitch signal groups, two signal groups of a signal group obtained by sampling the pair of signals with an interval of a predetermined number of pixel cells from the broad range signal group and the remaining signal group, performs a correlation operation on the signals of the first pixel cells and the signals of the second pixel cells with respect to each of the two broad pitch signal groups and calculates the defocus amount using the two correlation operation results.

It is disclosed the imaging device, wherein when a brightness of a subject exceeds a predetermined value, the second defocus amount calculating unit performs second processing which calculates the defocus amount based on the correlation operation result on one of the two broad pitch signal groups.

It is disclosed the imaging device, further comprising: an imaging element driving unit that, when the defocus amount is calculated by the first processing, is driven to independently read out the two broad pitch signal groups from the imaging element.

It is disclosed the imaging device, wherein when a brightness of a subject exceeds a predetermined value, the second defocus amount calculating unit performs second processing which calculates the defocus amount based on the correlation operation result on one of the two broad pitch signal groups, and when the brightness of the subject exceeds the predetermined value, the imaging element driving unit omits to read out the other of the two broad pitch signal groups from the imaging element.

It is disclosed the imaging device, wherein the second defocus amount calculating unit performs third processing which divides the broad range signal group into a plurality of groups which is continuously arranged and each of which has a plurality of pixel cells, adds the signals in the first pixel cells in each group and adds the signals in the second pixel cells in each group to generate the broad pitch signal group and calculates the defocus amount based on the correlation operation result of the signal group in the first pixel cells and the signal group in the second pixel cells in the broad pitch signal group.

It is disclosed the imaging device, wherein when the brightness of the subject is equal to or smaller than the predetermined value, the second defocus amount calculating unit calculates the defocus amount by the third processing.

It is disclosed the imaging device, wherein the third processing is processing which adds the signals of the first pixel cells in each group in the imaging element and adds the signals of the second pixel cells in each group in the imaging element to generate the broad pitch signal group.

It is disclosed a focus control method of an imaging device including an imaging element that has a plurality of pairs of first pixel cells and second pixel cells receiving a pair of light fluxes passing through different pupil regions of an photographing optical system and outputting signals according to a light amount, the method comprising: a first defocus amount calculating step that calculates a defocus amount using a narrow range signal group obtained from the plurality of pairs in a first range; a second defocus amount calculating step that calculates a defocus amount using a broad range signal group obtained from all the pairs in a second range which includes the first range and is broader than the first range; and a focus control step that controls a focus state of the imaging optical system based on the defocus amount calculated by the first defocus amount calculating step and the defocus amount calculated by the second defocus amount calculating step, wherein the second defocus amount calculating step generates a broad pitch signal group having an arrangement pitch being larger than an arrangement pitch of the narrow range signal groups using the broad range signal group and calculates the defocus amount using the broad pitch signal group.

According to the present invention, an imaging device and a focus control method which may perform phase difference AF with high precision and at a high speed may be provided.

Although the present invention has been described with reference to the detailed and specific embodiments thereof, it is obvious to those skilled in the art that various changes or modifications may be made without departing from the spirit and scope of the present invention.

This application is based on Japanese Patent Application No. 2012-104574 filed on May 1, 2012, the contents of which are incorporated herein by reference.

REFERENCE SIGNS LIST

1: Photographing lens
5: Solid-state imaging element
30: Imaging pixel cell
31R, 31L: Phase difference detecting pixel cell

The invention claimed is:

1. An imaging device, comprising:
   an imaging element that has a plurality of pairs of first pixel cells and second pixel cells receiving a pair of light fluxes passing through different pupil regions of an photographing optical system and outputting signals according to a light amount;
   a first defocus amount calculating unit that calculates a defocus amount using a narrow range signal group obtained from the plurality of pairs in a first range;

a second defocus amount calculating unit that calculates a defocus amount using a broad range signal group obtained from all the pairs in a second range which includes the first range and is broader than the first range; and a focus control unit that controls a focus state of the imaging optical system based on the defocus amount calculated by the first defocus amount calculating unit and the defocus amount calculated by the second defocus amount calculating unit, wherein the second defocus amount calculating unit generates a broad pitch signal group having an arrangement pitch being larger than an arrangement pitch of the narrow range signal groups using the broad range signal group and calculates the defocus amount using the broad pitch signal group.

2. The imaging device of claim 1, wherein the second defocus amount calculating unit performs first processing which generates as the broad pitch signal groups, two signal groups of a signal group obtained by sampling the pair of signals with an interval of a predetermined number of pixel cells from the broad range signal group and the remaining signal group, performs a correlation operation on the signals of the first pixel cells and the signals of the second pixel cells with respect to each of the two broad pitch signal groups and calculates the defocus amount using the two correlation operation results.

3. The imaging device of claim 2, wherein when a brightness of a subject exceeds a predetermined value, the second defocus amount calculating unit performs second processing which calculates the defocus amount based on the correlation operation result on one of the two broad pitch signal groups.

4. The imaging device of claim 2, further comprising:
an imaging element driving unit that, when the defocus amount is calculated by the first processing, is driven to independently read out the two broad pitch signal groups from the imaging element.

5. The imaging device of claim 4, wherein when a brightness of a subject exceeds a predetermined value, the second defocus amount calculating unit performs second processing which calculates the defocus amount based on the correlation operation result on one of the two broad pitch signal groups, and when the brightness of the subject exceeds the predetermined value, the imaging element driving unit omits to read out the other of the two broad pitch signal groups from the imaging element.

6. The imaging device of claim 1, wherein the second defocus amount calculating unit performs third processing which divides the broad range signal group into a plurality of groups which is continuously arranged and each of which has a plurality of pixel cells, adds the signals in the first pixel cells in each group and adds the signals in the second pixel cells in each group to generate the broad pitch signal group and calculates the defocus amount based on the correlation operation result of the signal group in the first pixel cells and the signal group in the second pixel cells in the broad pitch signal group.

7. The imaging device of claim 6, wherein when the brightness of the subject is equal to or smaller than the predetermined value, the second defocus amount calculating unit calculates the defocus amount by the third processing.

8. The imaging device of claim 6, wherein the third processing is processing which adds the signals of the first pixel cells in each group in the imaging element and adds the signals of the second pixel cells in each group in the imaging element to generate the broad pitch signal group.

9. A focus control method of an imaging device including an imaging element that has a plurality of pairs of first pixel cells and second pixel cells receiving a pair of light fluxes passing through different pupil regions of an photographing optical system and outputting signals according to a light amount, the method comprising:

a first defocus amount calculating step that calculates a defocus amount using a narrow range signal group obtained from the plurality of pairs in a first range;

a second defocus amount calculating step that calculates a defocus amount using a broad range signal group obtained from all the pairs in a second range which includes the first range and is broader than the first range; and a focus control step that controls a focus state of the imaging optical system based on the defocus amount calculated by the first defocus amount calculating step and the defocus amount calculated by the second defocus amount calculating step, wherein the second defocus amount calculating step generates a broad pitch signal group having an arrangement pitch being larger than an arrangement pitch of the narrow range signal groups using the broad range signal group and calculates the defocus amount using the broad pitch signal group.

* * * * *